(12) United States Patent  (10) Patent No.: US 12,219,943 B2
Jo et al.  (45) Date of Patent: Feb. 11, 2025

(54) FISHING REEL AND CORROSION MEMBER MOUNTED ON FISHING REEL

(71) Applicant: GLOBERIDE, Inc., Tokyo (JP)

(72) Inventors: Hideki Jo, Tokyo (JP); Tomoaki Sakiyama, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 176 days.

(21) Appl. No.: 18/076,114

(22) Filed: Dec. 6, 2022

(65) Prior Publication Data

US 2023/0172180 A1    Jun. 8, 2023

(30) Foreign Application Priority Data

Dec. 7, 2021 (JP) .................................. 2021-198216

(51) Int. Cl.
*A01K 89/01* (2006.01)
*A01K 89/00* (2006.01)
*A01K 89/015* (2006.01)

(52) U.S. Cl.
CPC ........ *A01K 89/0193* (2015.05); *A01K 89/006* (2013.01)

(58) Field of Classification Search
CPC ........ A01K 89/0193; A01K 89/011221; A01K 89/01928; A01K 89/0192
See application file for complete search history.

(56) References Cited

U.S. PATENT DOCUMENTS

| 5,560,560 | A | * | 10/1996 | Hirose | ................. | A01K 89/015 |
| | | | | | | 242/321 |
| 2002/0185561 | A1 | * | 12/2002 | Koike | ................ | A01K 89/0108 |
| | | | | | | 242/223 |
| 2007/0181728 | A1 | | 8/2007 | Kawasaki | | |
| 2010/0243781 | A1 | | 9/2010 | Hayashi | | |

FOREIGN PATENT DOCUMENTS

| CN | 101843231 | A | | 9/2010 | | |
| CN | 101816296 | B | * | 10/2013 | ........... | A01K 89/015 |
| JP | H11-225633 | A | | 8/1999 | | |
| JP | 2000120730 | A | * | 4/2000 | | |
| JP | 2001204311 | A | * | 7/2001 | | |

(Continued)

OTHER PUBLICATIONS

Jul. 15, 2024 Office Action issued in Chinese Application No. 202211471477.9.

(Continued)

*Primary Examiner* — Emmanuel M Marcelo
(74) *Attorney, Agent, or Firm* — Oliff PLC

(57) ABSTRACT

According to the present disclosure, in a fishing reel that comprises component members of various types arranged in a reel body, winds up a fishing line around a spool, and releases the fishing line that has been wound up around the spool, the component members are arranged in a contact state or a proximity state, the component members comprising different types of materials that are different in a raw material, and a corrosion member is attachably/detachably arranged on the component members in a conductive state, (Continued)

the corrosion member having a potential difference that is greater than the potential difference between the component members comprising the different types of materials.

12 Claims, 15 Drawing Sheets

(56) References Cited

FOREIGN PATENT DOCUMENTS

| | | | |
|---|---|---|---|
| JP | 2001-355774 A | | 12/2001 |
| JP | 2002209483 A | * | 7/2002 |
| JP | 2002253089 A | * | 9/2002 |
| JP | 2003023934 A | | 1/2003 |
| JP | 2003102349 A | * | 4/2003 |
| JP | 2005095024 A | * | 4/2005 |
| JP | 2005312320 A | * | 11/2005 |
| JP | 2007159427 A | | 6/2007 |
| JP | 2007-205026 A | | 8/2007 |
| JP | 2007270276 A | * | 10/2007 |
| JP | 2013021935 A | * | 2/2013 |
| JP | 2013021936 A | * | 2/2013 |

OTHER PUBLICATIONS

Aug. 1, 2024 Office Action issued in Japanese Application No. 2021-198216.

* cited by examiner

FISHING REEL AND CORROSION MEMBER MOUNTED ON FISHING REEL

CROSS-REFERENCE TO RELATED APPLICATION

This application claims priority under 35 U.S.C. § 119 to Japanese Patent Application No. 2021-198216 filed on Dec. 7, 2021 in the Japanese Patent Office, the entire contents of each hereby incorporated by reference.

FIELD

The present disclosure relates to a variety of fishing reels, such as a dual-bearing reel, a spinning reel, a single-bearing reel, or an electric reel. The present disclosure also relates to a corrosion member that is mounted on such a fishing reel.

BACKGROUND

The fishing reel described above includes a large number of component members in order to exhibit predetermined functions, and is used in an environment that is close to seawater, water, or the like (in a conductive atmosphere). The component members have a structure in which the component members are organically associated with (in contact with or in the proximity of) each other, and include a variety of materials. Therefore, in a portion where different types of materials having a potential difference are associated with each other, the potential difference is generated, and in a use environment in which the component members are exposed to the conductive atmosphere described above, corrosion (electrolytic corrosion) is accelerated. Accordingly, in order to avoid such corrosion, surface treatment is performed, for example, to form an insulating film on surfaces of component members (see, for example, JP 2007-159427 A). Furthermore, a sealing material is interposed between component members, and this avoids the entering of seawater or water, and avoids corrosion (see, for example, JP 2003-023934 A).

SUMMARY

Meanwhile, in some cases, the fishing reel is damaged due to contact with another object, falling, or the like in real fishing or at the time of moving to a fishing spot, carrying the fishing reel, or the like. Therefore, in some cases, the fishing reel is exposed to an environment of seawater, water, or the like in a non-insulating state, and this often results in a situation where corrosion is easily caused. Furthermore, in the fishing reel, a motion to wind a fishing line including seawater or water around a spool, and release the fishing line is repeated. Therefore, seawater or water easily enters inside the fishing reel from a gap near the spool, and there is a structural problem that causes corrosion.

In order to use the fishing reel in a satisfactory state during a long period, it is requested that maintenance, the checking of a degree or a state of worsening of corrosion, or the like be regularly performed. However, in some cases, corrosion is worsened in a portion that is difficult to view, and there is a problem in which it is difficult to maintain satisfactory performance during a long period.

The present disclosure has been made focusing on the problems described above, and it is an object of the present disclosure to provide a fishing reel that is capable of effectively avoiding corrosion of a principal component member, and a corrosion member that is mounted on such a fishing reel.

According to the present disclosure, corrosion of a principal component member is avoided according to a concept that is completely different from corrosion avoiding means that is used in a conventional fishing reel. Stated another way, in order to achieve the object described above, according to the present disclosure, in a fishing reel that comprises component members of various types in a reel body, winds up a fishing line around a spool, and releases the fishing line that has been wound up around the spool, the component members are arranged in a contact state or a proximity state, the component members comprising different types of materials that are different in a raw material, and a corrosion member is attachably/detachably arranged on the component members in a conductive state, the corrosion member having a potential difference that is greater than the potential difference between the component members comprising the different types of materials.

In the conventional fishing reel, component members are not caused to corrode as much as possible by adopting corrosion avoiding measures in the component members themselves, or arranging a sealing structure in order to not cause seawater or water to enter from the outside. However, according to the present disclosure, such a conventional corrosion avoiding means is not used, and the corrosion member that proactively promotes corrosion is arranged. This avoids corrosion of the component members of the fishing reel. The corrosion member can use a material having a potential difference that is greater than a potential difference that is generated between the component members comprising the different types of materials that are different in a raw material. Specifically, the corrosion member comprises a material having a great ionization tendency (for example, zinc, titanium, aluminum, or magnesium).

The material that is included in the corrosion member, and has a great ionization tendency can be selected according to the materials of the component members. Such a material having a great ionization tendency is brought into contact with the component members. Therefore, even if conductive liquid such as seawater or water enters, and a flow of electrons is generated, the flow of electrons is generated in the corrosion member with priority, and this can avoid corrosion of the component members. Stated another way, according to the present disclosure, the corrosion member is caused to corrode with priority, and a technical idea that is different from the conventional corrosion avoiding structure described above of component members is achieved.

Furthermore, a configuration in which the corrosion member is proactively caused to corrode is employed. This also enables a user to grasp a maintenance timing of the fishing reel to a certain extent in accordance with a corrosion status of the corrosion member.

Moreover, according to the present disclosure, a corrosion member that is mounted on a fishing reel is provided. Component members of various types are arranged in a reel body, and comprise different types of materials that are different in a raw material, the corrosion member is attachable to or detachable from a portion where the component members comprising the different types of materials are arranged in a contact state or a proximity state, and the corrosion member comprises a material having a potential difference that is greater than the potential difference between the component members comprising the different types of materials.

According to the present disclosure, a fishing reel that is capable of effectively avoiding corrosion of a principal component member, and a corrosion member that is mounted on such a fishing reel are obtained.

BRIEF DESCRIPTION OF THE DRAWINGS

FIG. 13A is a photograph indicating a state where the corrosion member of FIG. 12 has not been arranged on the set plate, and FIG. 13B is a photograph indicating a state where the corrosion member of FIG. 12 has been mounted on the set plate.

DETAILED DESCRIPTION

Figure 1:
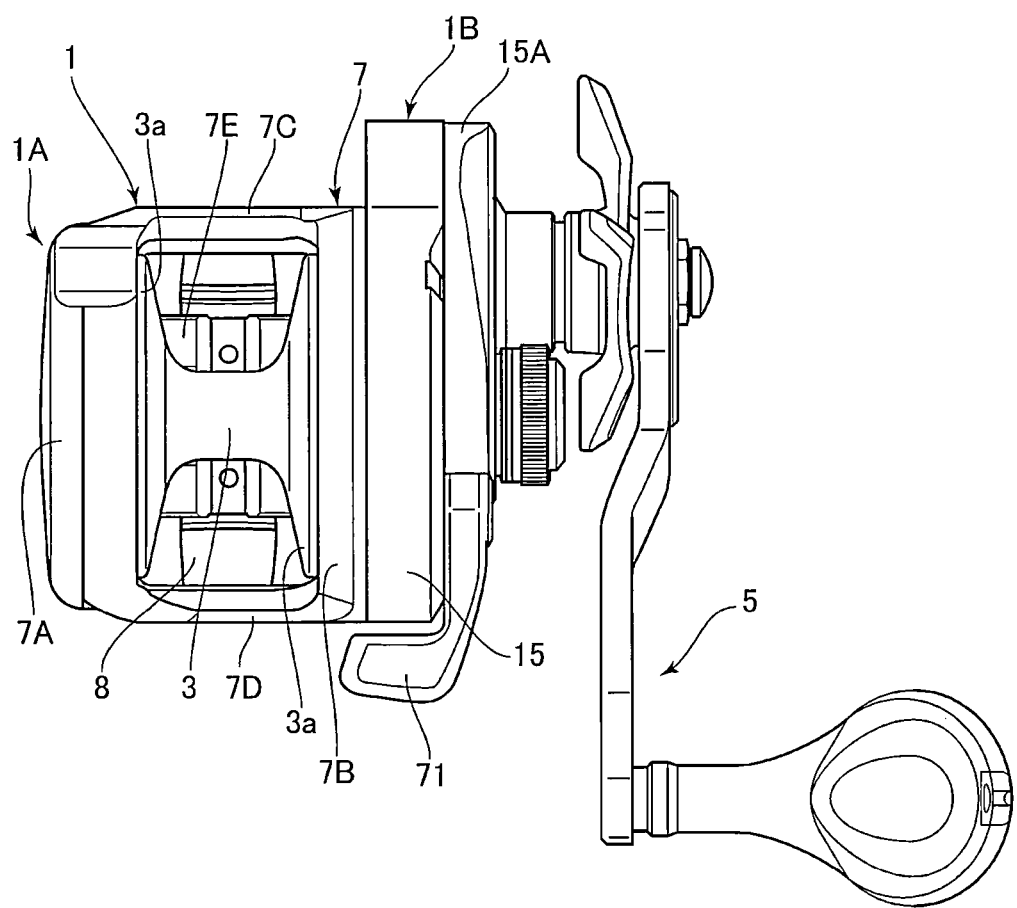
FIG. 1 is a plan view illustrating a first embodiment (a dual-bearing reel) of a fishing reel according to the present disclosure.

FIGS. 1 to 5 are diagrams illustrating a first embodiment (a dual-bearing reel) of a fishing reel according to the present disclosure.

A reel body 1 of the dual-bearing reel according to the present embodiment comprises a left-hand side plate 1A, a right-hand side plate 1B, and a spool 3 that is rotatably supported between both side plates 1A and 1B. In the present embodiment, a handle 5 is provided on a side of the right-hand side plate 1B. A winding-up operation is performed on the handle 5, and therefore the spool 3 is driven to rotate by using a publicly known winding-up driving mechanism (a right-hand handle type).

The reel body 1 comprises a frame 7 that forms the left-hand and right-hand side plates 1A and 1B. This frame 7 is integrally formed by using, for example, a metal material of an aluminum alloy, a left-hand frame 7A forms the left-hand side plate 1A as it is, and a right-hand frame 7B mounted with a cover body 15 forms the right-hand side plate 1B.

The frame 7 comprises a coupler that couples the left-hand side plate 1A and the right-hand side plate 1B. In the present embodiment, a front coupler 7C is provided on a front side of the spool 3, a rear coupler 7D is provided on a rear side of the spool 3, and a lower coupler 7E is provided on a lower side of the spool. These couplers are formed integrally with the left-hand frame 7A and the right-hand frame 7B. Note that a reel leg 8 is integrally mounted on the lower coupler 7E (the reel leg may be formed integrally with the frame). The reel leg 8 is mounted on a reel seat of a fishing rod.

The left-hand side plate 1A comprises an annular recessed portion 7a that houses a flange 3a of the spool 3. Furthermore, in a center region of the left-hand side plate 1A, a recessed portion 7b is disposed. In the recessed portion 7b, a bearing 10 is arranged, and rotatably supports a left-hand side end of a driving shaft 3A of the spool 3. Moreover, in the left-hand side plate 1A, a publicly known spool stopper 12 is provided. The spool stopper 12 prevents the spool 3 from rotating in a fishing line sending-out direction. This spool stopper 12 comprises a slide lever 12a that protrudes from an outside face of the left-hand side plate 1A. An operation is performed to slide the slide lever 12a, and therefore switching can be performed between a state where the spool 3 is prevented from rotating in the fishing line sending-out direction and a state where the spool 3 is allowed to rotate in the fishing line sending-out direction.

The right-hand frame 7B has a ring shape including a circular opening 7d that enables the spool 3 to be detached to a handle side. As described above, the right-hand frame 7B mounted with the cover body 15 forms the right-hand side plate 1B. This right-hand side plate 1B houses various function parts (component members), such as the winding-up mechanism, a drag mechanism, or a clutch mechanism, that transmit a rotation driving force of the handle 5 to the spool.

In a center of the spool 3, the driving shaft 3A is inserted and fixed, and the left-hand side end is rotatably supported on the left-hand side plate 1A (the left-hand frame 7A), by using the bearing 10. Furthermore, on a right-hand side of the spool 3 in the driving shaft 3A, a bearing 3C is arranged, and a pin 3D that a pinion gear 23 is engaged with or disengaged from is provided on an outside of a radial direction of the bearing 3C. The pinion gear 23 slides in the radial direction by using the clutch mechanism. The diameter of the driving shaft 3A decreases on an outside in the radial direction of a position where the pin 3D is provided, and the driving shaft 3A is inserted into the pinion gear 23.

The cover body 15 is attachably/detachably fixed to the right-hand frame 7B, and the right-hand frame 7B and the cover body 15 form the right-hand side plate 1B of the reel body 1. This cover body 15 has a recessed shape in such a way that a housing space S is generated between the cover body 15 and the right-hand frame 7B, and the various function parts described above are arranged in the housing space S.

The various function parts that are arranged in the housing space S are described below with reference to the drawings together with FIG. 6. As described above, in the housing space S, a winding-up driving mechanism 20, a drag mechanism 50, a clutch mechanism 70, and the like are arranged. The winding-up driving mechanism 20 transmits a rotation driving force of the handle 5 to the spool 3. The drag mechanism 50 applies a desired braking force to a fishing line that is sent out from the spool 3. The clutch mechanism 70 switches the spool between a winding-up state and a free rotation state.

In the present embodiment, the housing space S is disposed between the cover body 15 and a set plate 16 mounted on the cover body 15, and the various mechanisms described above are arranged in this housing space S. Stated another way, when the cover body 15 is removed from the right-hand frame 7B, the winding-up driving mechanism 20, the drag mechanism 50, and the clutch mechanism 70 are located on a side closer to the cover body 15 than the set plate 16, and component members of each of the mechanisms are not exposed (even if the cover body 15 is removed from the right-hand frame 7B, the component members are not scattered).

The set plate 16 has a roughly cylindrical shape including a support portion 16a having a circular plate shape, and an annular support portion 16b that is disposed at an outer peripheral end of the support portion 16a, and protrudes to a spool side. On the support portion 16a, a flange 16c is integrally formed from the annular support portion 16b to an outside in the radially direction. A plurality of fixing screws 17 is screwed into the flange 16c toward a side of the cover body, and therefore the set plate 16 is fastened with screws, and is fixed to a side of an inner face of the cover body 15 (see FIG. 6). Furthermore, the annular support portion 16b is fitted into an inner face of the circular opening 7d that is disposed in the right-hand frame 7B.

Figure 6:
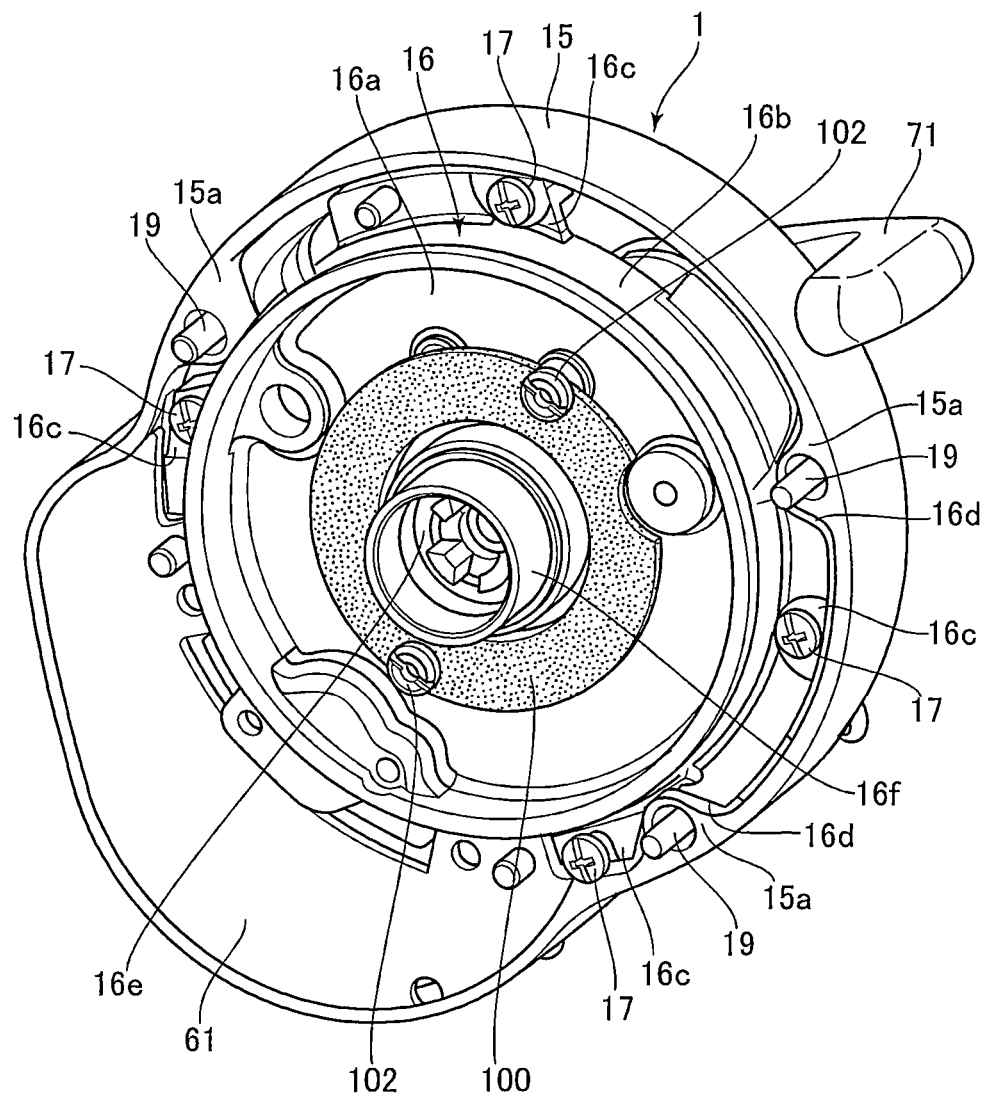
FIG. 6 is a diagram illustrating a configuration of a set plate that is arranged on a side plate on the side of the handle of the fishing reel illustrated in FIG. 1.

As illustrated in FIG. 6, the flange 16c includes a plurality of partial cutouts 16d along a circumferential direction, and a fixing portion 15a that is disposed in the cover body 15 is located in the cutouts. A plurality of fixing portions 15a is disposed from an annular surface of the cover body 15 toward an inside in the radial direction, and each includes a screw hole for fixing. Furthermore, on a side face of the right-hand frame 7B, a fixing hole is disposed in a position that corresponds to the screw hole. Therefore, the screw hole of the cover body 15 is aligned with the fixing hole of the right-hand frame 7B, and a locking screw 19 is screwed from an outside, and thus the cover body 15 is fixed to the right-hand frame 7B.

In a center portion of the support portion 16a of the set plate 16, a through-hole 16e is disposed. Around the through-hole 16e, a support portion (an annular wall 160 is disposed to protrude toward the spool side. Furthermore, in a portion on an outer peripheral side of the support portion 16a, a recessed portion 16g is disposed, and is open toward a side of the cover body. In the through-hole 16e, the pinion gear 23 included in the winding-up driving mechanism 20 is arranged, and in the recessed portion 16g, a proximal end of a handle shaft 5A included in the winding-up driving mechanism 20 is arranged.

Here, a configuration of the winding-up driving mechanism 20 is described. As described above, in the present embodiment, the handle 5 that drives and rotates the spool 3 is provided on a side of the right-hand side plate 1B, and the winding-up driving mechanism 20 is arranged in the housing space S between the set plate 16 and the cover body 15. The winding-up driving mechanism 20 comprises the handle shaft 5A mounted with the handle 5, a drive gear 21 that is rotatably mounted on this handle shaft 5A, and the pinion gear 23 that is meshed with the drive gear 21.

The handle 5 on which a winding-up operation is performed is mounted on an end of the handle shaft 5A, and the handle shaft is rotatably supported in the right-hand side plate by a bearing 25 and a bearing 26. The bearing 25 is arranged between the handle shaft 5A and the cover body 15, and the bearing 26 is arranged between the handle shaft 5A and the recessed portion 16g that is disposed in the right-hand frame 7B. The driving shaft 3A of the spool is inserted into the pinion gear 23 that is meshed with the drive gear 21, and the pinion gear 23 is supported to be slidable in the axial direction relative to the driving shaft 3A. In the present embodiment, both sides of the pinion gear 23 are rotatably supported by bearings 27 and 28, respectively. In this case, the bearing 27 is arranged in a portion of the through-hole 16e of the set plate 16, and the bearing 28 is arranged in a publicly known braking device 29 that is mounted on the cover body 15, abuts onto an end face of the driving shaft 3A of the spool, and applies a braking force to rotation of the spool.

On the handle shaft 5A, a publicly known one-way clutch 30 is arranged between the handle shaft 5A and the cover body 15, and the one-way clutch 30 allows the handle 5 to rotate in the fishing line winding-up direction, and prevents the handle 5 from reversely rotate. Furthermore, on a portion of the handle shaft 5A, a publicly known drag mechanism 50 is arranged, and the drag mechanism 50 applies a desired braking force to the fishing line that is sent out from the spool 3. This drag mechanism 50 includes a plurality of braking plates 51, a ratchet gear 52, and an operation knob 55. The plurality of braking plates 51 is arranged in an annular recessed portion 21a that is disposed in the drive gear 21. The ratchet gear 52 is whirl-stopped and fixed to the handle shaft 5A to be immoveable in the axial direction, and comes in plane contact with the drive gear 21. The operation knob 55 is disposed on the handle shaft 5A. An operation is performed to rotate the operation knob 55, and the operation knob 55 moves in the axial direction. Therefore, if an operation is performed to rotate the operation knob 55, the braking plates 51 are pressed by using an inner ring of the one-way clutch 30, and a desired pressing force acts between the drive gear 21 and the handle shaft 5A. Stated another way, an operation is performed to rotate the operation knob 55, and therefore a pressing force to be applied to the braking plates 51 is adjusted, and a desired drag force can act on the fishing line that is sent out from the spool 3.

Note that a latching claw (not illustrated) can be engaged with the ratchet gear 52. This can reliably prevent the handle shaft 5A from reversely rotating, when a reverse rotation avoiding function of the one-way clutch 30 has slipped.

On the set plate 16, a publicly known clutch mechanism 70 is arranged, and the clutch mechanism 70 switches the spool 3 between the winding-up state and the free rotation state. This clutch mechanism 70 comprises an operation member 71, a clutch plate 72, and an engagement member 74. The operation member 71 is arranged on the right-hand side plate 1B, and is supported to be rotationally movable along an outer peripheral face. The clutch plate 72 is supported by the set plate 16 to be rotationally movable, and rotationally moves in accordance with an operation performed on the operation member 71. The engagement member 74 engages with a circumferential groove that is disposed on an outer peripheral face of the pinion gear 23. An operation is performed to rotationally move the clutch plate 72, and the pinion gear 23 is caused to slide in the axial direction. Stated another way, an operation is performed on the operation member 71, and therefore the pinion gear 23 is caused to slide in the axial direction, an end 23b having a noncircular cross section of the pinion gear 23 is engaged with or disengaged from the pin 3D that is provided in the driving shaft 3A of the spool 3, and switching can be performed between a power transmission state (a clutch ON state) and a power cutoff state (a clutch OFF state). In this case, the ratchet gear 52 and the set plate 16 are provided with a returning mechanism that automatically causes the clutch mechanism to return from the OFF state to the ON state when a winding-up operation has been performed on the handle.

The cover body 15 comprises a swelling portion 15A that swells in a roughly semicircular shape to partially house the drive gear 21 mounted on the handle shaft 5A. This swelling portion is attached to the right-hand frame 7B by using a screw, and is closed by a closing member 61 that is disposed in a roughly semicircular shape. Stated another way, as described above, if the cover body 15 on which the set plate 16 has been installed is installed on the right-hand frame 7B, the swelling portion 15A is closed by the closing member 61 that has been attached to the right-hand frame 7B, as it is.

As described above, in the right-hand side plate of the reel body 1, a large number of component members (function parts) are housed, and these are supported by the set plate 16, as described above. In this case, the large number of component members comprise different types of materials that are different in a raw material, and are arranged in a contact state or a proximity state. Therefore, if conductive liquid such as seawater or water adheres to the large number of component members, or the large number of component members are exposed to such an atmosphere, a flow of electrons is generated due to a potential difference, and this causes corrosion. For example, in a portion of the through-hole 16e of the set plate 16, corrosion is likely to be generated in a portion of the bearing 27 or the like that is arranged between the support portion (the annular wall 160 that protrudes toward the spool side and a side portion of the pinion gear 23 (such corrosion decreases rotation performance).

In the present embodiment, a corrosion member 100 is attachably/detachably arranged on the set plate 16 in a conductive state. The corrosion member 100 has a potential difference that is greater than a potential difference between the set plate 16 and the component members comprising different types of materials (components of the winding-up driving mechanism 20 or the clutch mechanism 70, an installation member such as a fixing screw, or the like). The corrosion member 100 comprises a material having a great ionization tendency, such as zinc, titanium, aluminum, or magnesium, and the material is selected and used according to the materials of the component members described above.

Such a corrosion member that comprises a material having a great ionization tendency is brought into contact with the component members (the set plate 16). Therefore, even if conductive liquid such as seawater or water enters, and a flow of electrons is generated, the flow of electrons is generated in the corrosion member 100 with priority, and corrodes the corrosion member 100. This can effectively avoid corrosion of other component members.

The corrosion member 100 according to the present embodiment comprises a plate-shaped member (for example, a zinc plate), and is attachably/detachably attached on a side of a spool facing face of the set plate 16. Specifically, as illustrated in FIG. 6, the corrosion member 100 is attachably/detachably attached to a flat face of the support portion 16a of the set plate 16, by using fixing means (a plurality of screws 102), and the corrosion member 100 comes into conductivity between the set plate 16 and the screws 102. Furthermore, the corrosion member 100 is arranged inside the right-hand side plate (a position that fails to be visually recognized from the outside). Therefore, a corroded member is not exposed, and appearance does not deteriorate. Furthermore, the corrosion member is not damaged due to falling or hitting against another object, and functions of the corrosion member can be exhibited. Moreover, the cover body 15 is removed from the right-hand frame 7B, and the set plate 16 is exposed. Therefore, a corrosion status of the corrosion member 100 can be checked (a maintenance timing is grasped).

As described above, in the present embodiment, in contrast to a conventional structure in which component members are not caused to corrode as much as possible by adopting corrosion avoiding measures in the component members themselves, or arranging a sealing structure in order to not cause seawater or water to enter from the outside, the corrosion member 100 that proactively promotes corrosion is arranged. This avoids corrosion of component members of a fishing reel (corrosion of principal component members), improves corrosion resistance, and avoids a deterioration of motion performance. Furthermore, a configuration in which the corrosion member 100 is provided, and is proactively caused to corrode is employed. This also enables a user to grasp a maintenance timing of the fishing reel to a certain extent in accordance with a corrosion status of the corrosion member 100.

Furthermore, in the present embodiment, the corrosion member 100 has a plate shape. Therefore, a space is saved, and the corrosion member can be efficiently arranged. In particular, a ring shape is employed in such a way that the support portion (the annular wall 160 of the set plate 16 protrudes. This can effectively avoid corrosion that is likely to be generated in a portion of the bearing 27 that is arranged in a center region of the set plate 16. Furthermore, a fishing line that seawater or water adheres to is wound around the spool 3, and this causes moisture to easily enter an inside of the side plate from a flange portion that is an edge of the spool. However, the corrosion member 100 is arranged on a side of the spool facing face of the set plate 16. This enables the corrosion member 100 to effectively corrode, and can avoid corrosion of principal component members.

Moreover, if an operation is performed to rotate the locking screw 19, and the cover body 15 is removed from the right-hand frame 7B, the set plate 16 has been fixed on a side of the cover body 15. Therefore, only the corrosion member 100 can be easily exchanged without exposing respective component members of the winding-up driving mechanism 20, the drag mechanism 50, and the clutch mechanism 70 that are installed inside the cover body 15, and maintainability can be improved.

Figure 7:
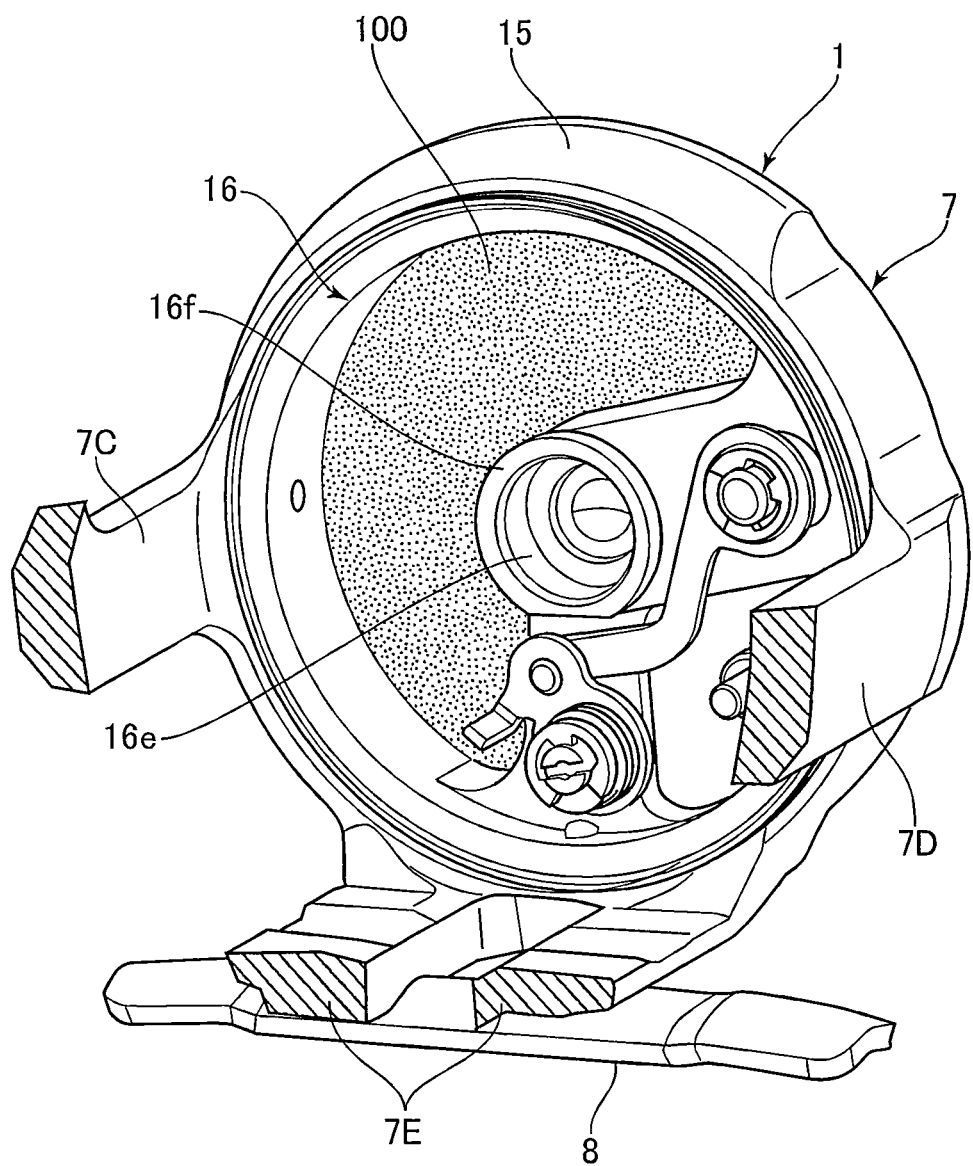
FIG. 7 is a diagram illustrating a variation of a corrosion member that is arranged on the side plate on the side of the handle of the fishing reel illustrated in FIG. 1.

FIG. 7 is a diagram illustrating a variation of the configuration described above. This variation indicates an example where the corrosion member 100 is formed into a plate-shaped member, and is attached to a surface of the support portion on the spool side of the set plate 16. In such a configuration, the corrosion member 100 can be exchanged together with the set plate 16. Furthermore, a configuration may be employed where the corrosion member 100 is caused to adhere to the support portion 16a in a peelable manner, and is peeled at the time of exchange.

Figure 8:
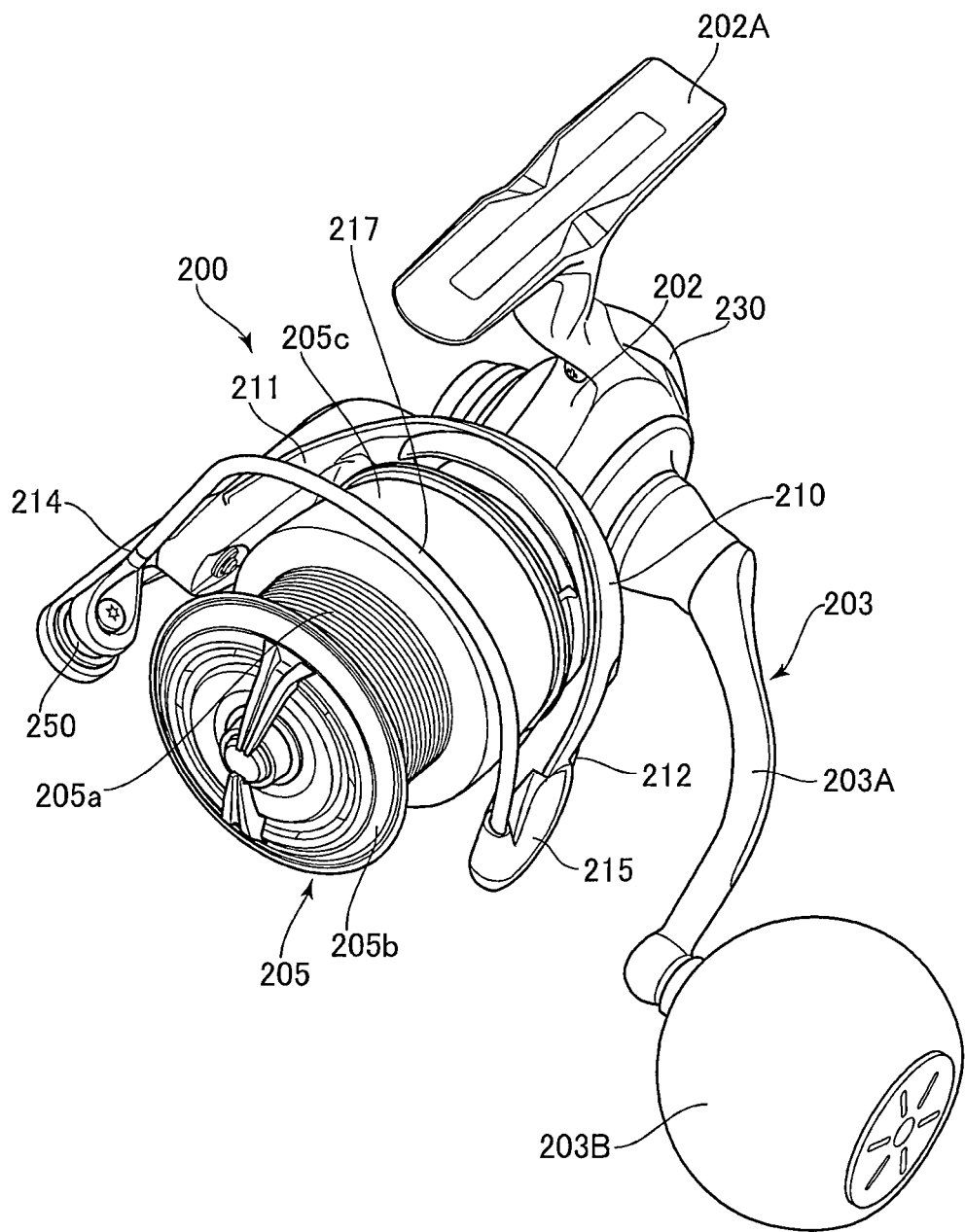
FIG. 8 is a perspective view illustrating a second embodiment (a spinning reel) of a fishing reel according to the present disclosure.

FIG. 8 is a diagram illustrating an example of a configuration of a second embodiment (a spinning reel) of a fishing reel according to the present disclosure. It is sufficient if the corrosion member 100, as described above, is formed to have a great potential difference from a component member on which the corrosion member 100 is to be installed, and specifically, a potential difference that is greater than a potential difference between the component member and another component member that is in contact with or in the proximity of the component member, and corrosion of the other component member can be effectively avoided regardless of an installation position.

A reel body 202 of the fishing spinning reel 200 illustrated in FIG. 8 comprises a reel leg 202A that is mounted on a fishing rod. In the reel body, a handle shaft is rotatably supported by using a bearing, and a handle 203 is mounted at an end of the handle shaft. A winding-up operation is performed on the handle 203. This handle 203 comprises a handle arm 203A, and a handle knob 203B that is located at a distal end. The handle knob 203B is grasped, and a winding-up operation can be performed on the handle 203. Furthermore, the handle shaft is coupled to a publicly known driving force transmission mechanism, a rotor 210 is driven to rotate in accordance with an operation to rotate the handle 203, and a spool 205 is moved forward or backward by using a publicly known oscillating mechanism.

The spool 205 comprises, for example, metal having a small specific gravity, such as aluminum, an aluminum alloy, or a magnesium alloy, or a synthetic resin material, and comprises a fishing line winding drum 205a, a front flange 205b, and a rear flange (a skirt) 205c. A fishing line is wound around the fishing line winding drum 205a. The front flange 205b and the rear flange 205c regulate a line winding amount of the fishing line winding drum 205a in a forward/backward direction.

The rotor 210 comprises a pair of support arms 211 and 212 at intervals of roughly 180°, and the pair of support arms 211 and 212 extend to a front side in the axial direction to face each other. The spool 205 is located between the pair of support arms, and is driven to move back and forth in the forward/backward direction. At respective distal ends of the support arms 211 and 212, bail support members 214 and 215 are supported to be rotationally movable between a fishing line winding-up position and a fishing line releasing position. Furthermore, a proximal end of a bail 217 having a semi-annular shape is attached to each of the bail support members 214 and 215, and the bail 217 is rotationally movable together with the bail support members 214 and 215. At a distal end of the bail support member 214, a fishing line guiding device (a line roller) 250 is arranged, and the fishing line guiding device 250 guides a fishing line to the spool.

In the spinning reel having the configuration described above, if an operation is performed to rotate the handle 203, the rotor 210 is driven to rotate by using a driving force transmission mechanism, and the spool 205 is driven to move back and forth in the forward/backward direction by using the oscillating mechanism. This causes the fishing line to be evenly wound around the fishing line winding drum 205a of the spool 205 via the fishing line guiding device 250 of the bail support member 215 that rotates together with the rotor 210.

In the spinning reel, as described above, similarly, the corrosion member 100 can be attachably/detachably provided in various places.

Figure 9:
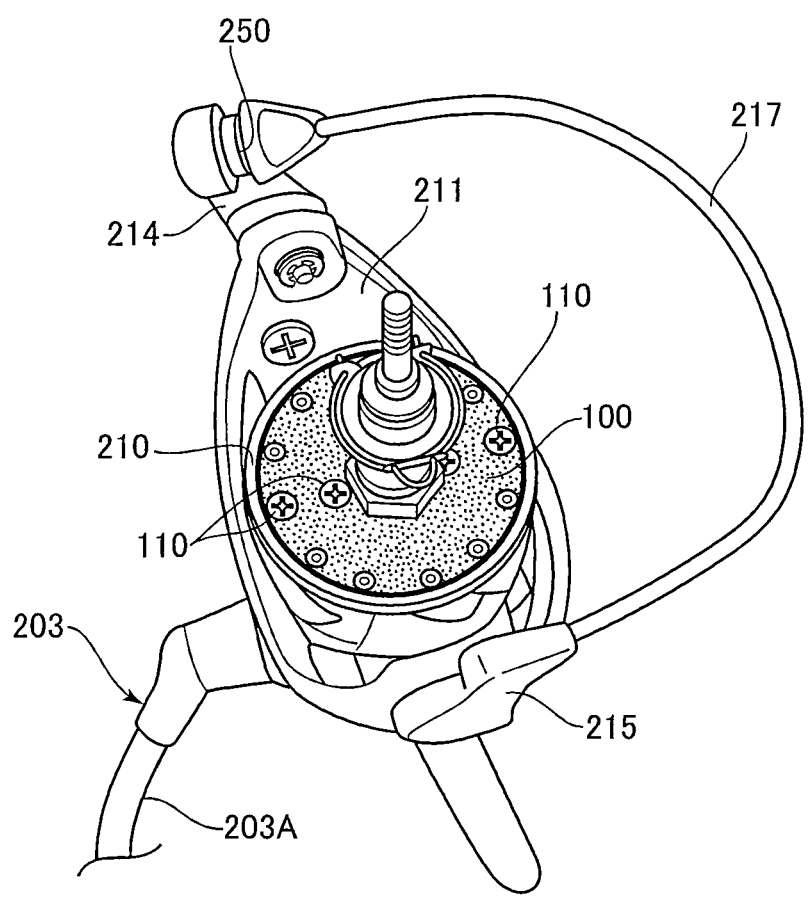
FIG. 9 is a diagram illustrating an internal portion of a rotor portion of the fishing reel illustrated in FIG. 8.
Figure 10:
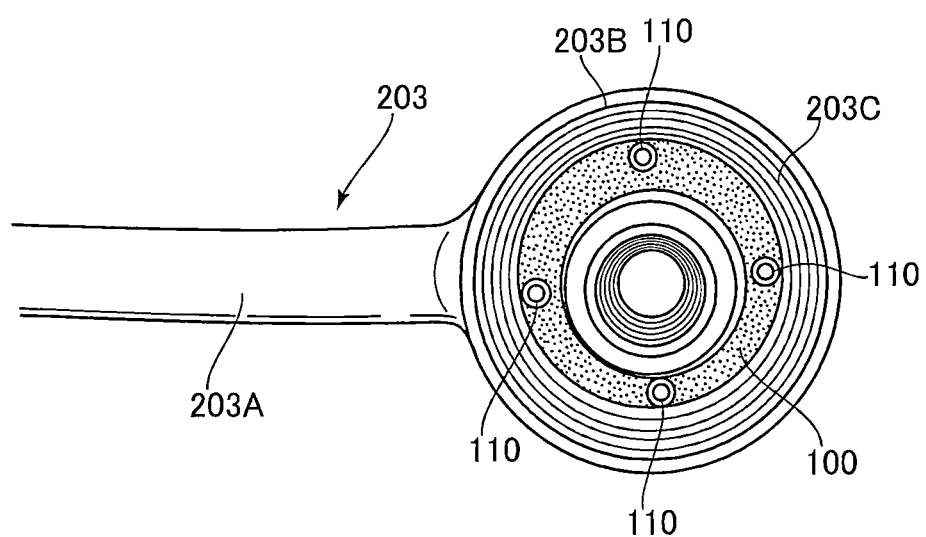
FIG. 10 is a diagram illustrating an inside of a handle knob of the fishing reel illustrated in FIG. 8.
Figure 11:
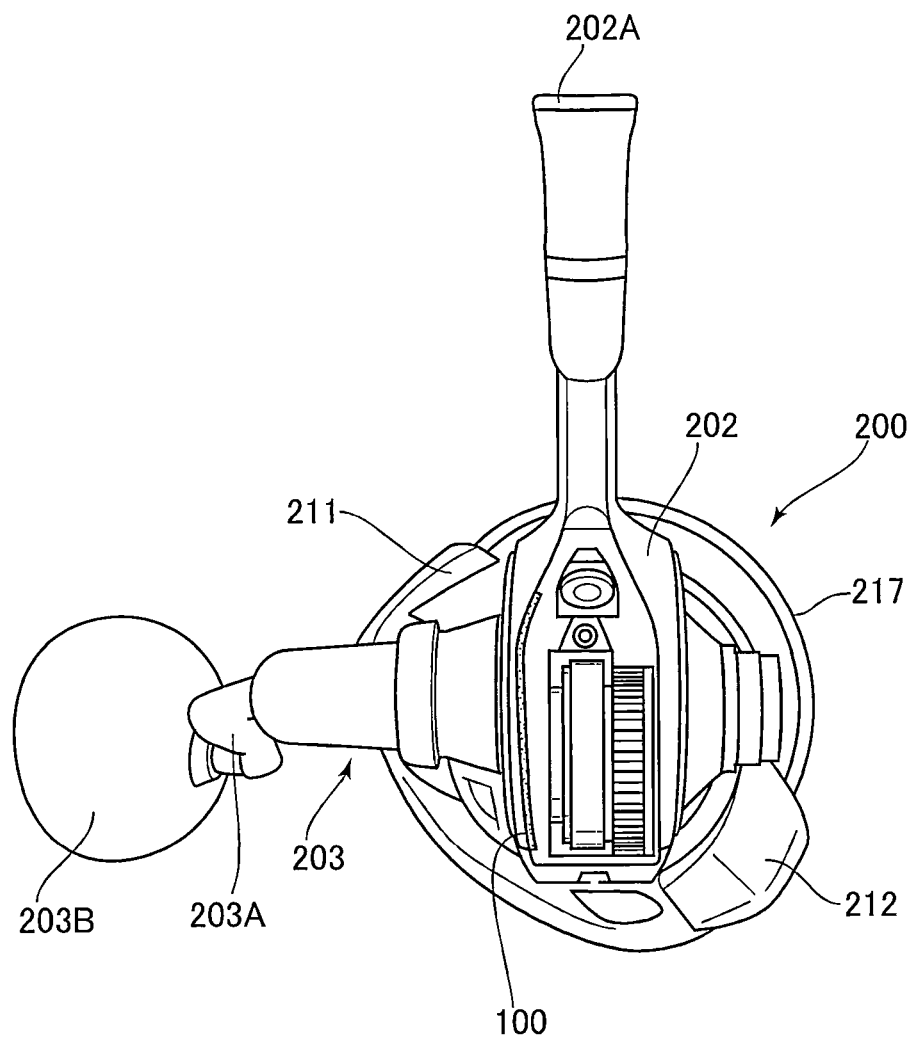
FIG. 11 is a diagram illustrating a state where a rear cap of the fishing reel illustrated in FIG. 8 has been removed.

For example, as illustrated in FIG. 9, the corrosion member 100 can be attachably/detachably mounted on an upper face of the rotor 210 that is driven to rotate, by using screws 110. Furthermore, as illustrated in FIG. 10, the corrosion member 100 may be attachably/detachably mounted on a knob cap 203C of the handle knob 203B that is provided at a distal end of the handle arm 203A, by using the screws 110. Alternatively, the corrosion member 100 can be attachably/detachably mounted in an arbitrary position inside the handle arm 203A (a position that is difficult to visually recognize from the outside), but this is not illustrated. Furthermore, as illustrated in FIG. 11, a publicly known rear cap 230 that is installed at a rear end of the reel body 202 is removed, and the corrosion member 100 can be attachably/detachably mounted in the reel body in an open portion (inside of the rear cap). Moreover, the corrosion member may be attached to an inner face of the rear cap 230 (inside the rear cap), and the rear cap 230 may be exchanged.

Figure 2:
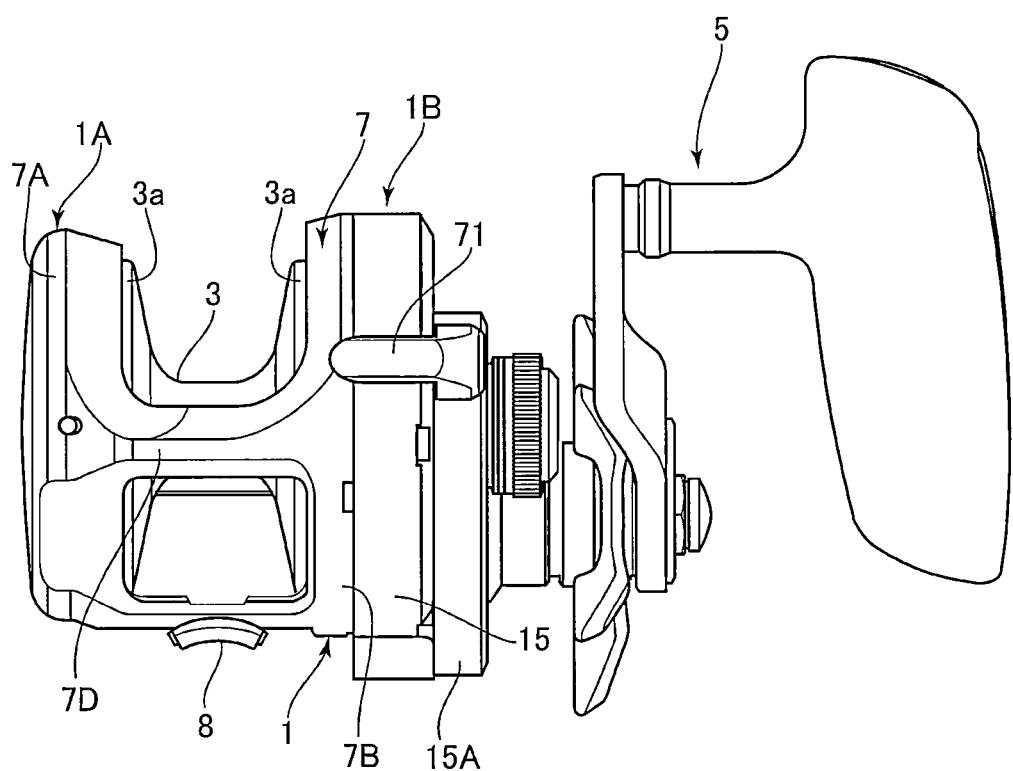
FIG. 2 is a rear view of the fishing reel illustrated in FIG. 1.
Figure 3:
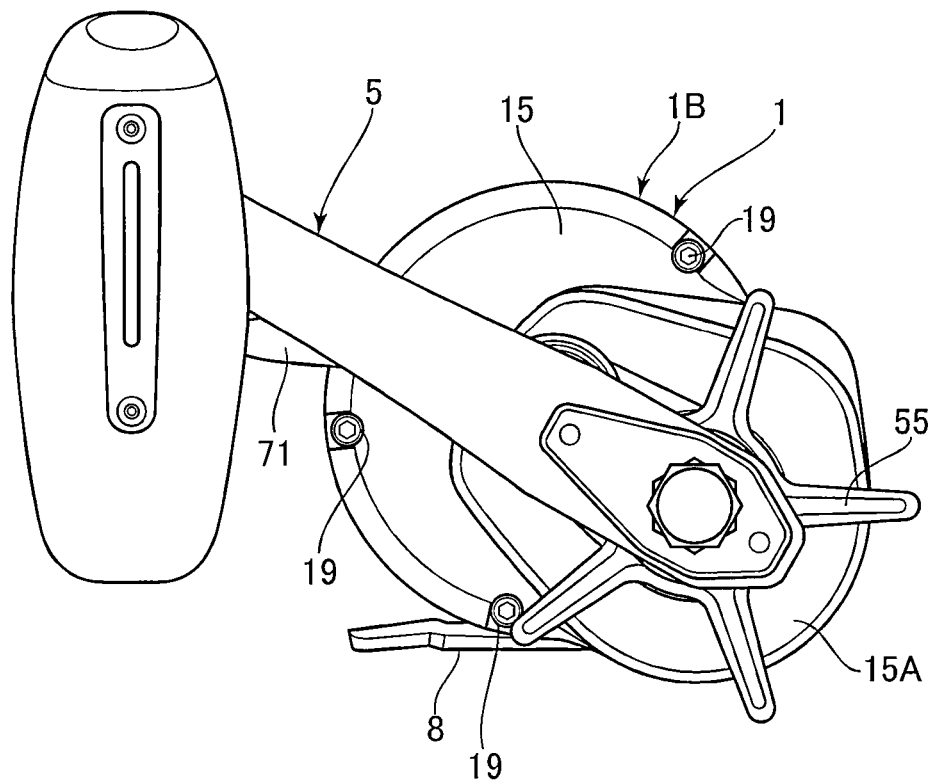
FIG. 3 is a side view viewed from a side of a handle of the fishing reel illustrated in FIG. 1.
Figure 4:
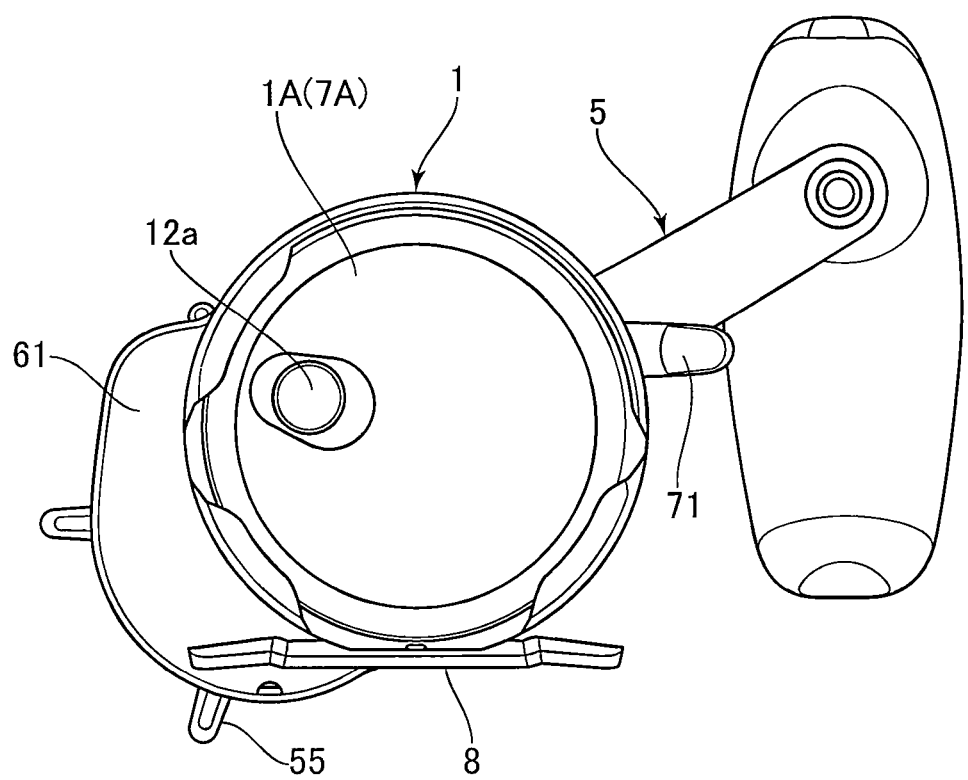
FIG. 4 is a side view viewed from an opposite side of the handle of the fishing reel illustrated in FIG. 1.
Figure 5:
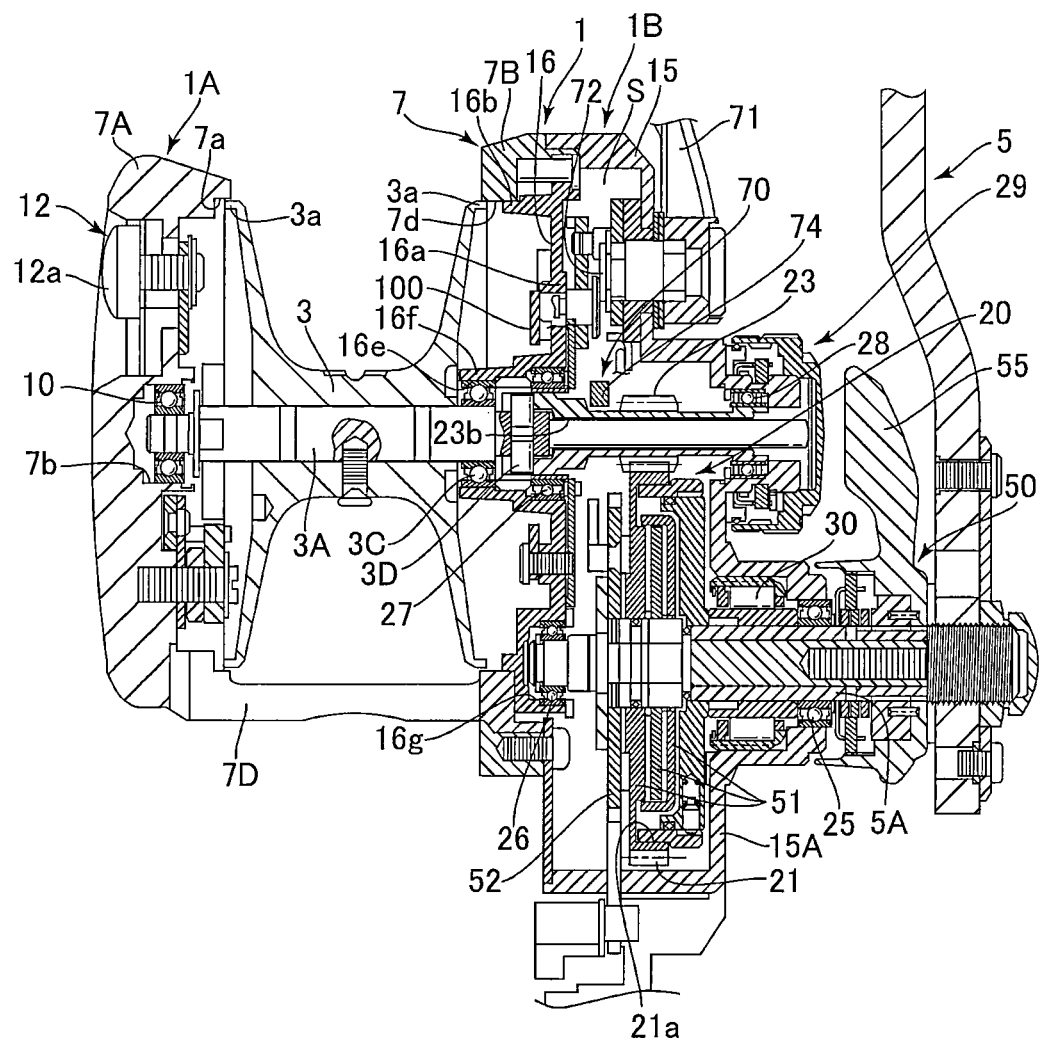
FIG. 5 is a diagram illustrating an internal configuration of the fishing reel illustrated in FIG. 1.

Moreover, the corrosion member 100 may be attachably/detachably mounted on a sole of the reel leg 202A that is mounted on a reel leg fixing portion of a fishing rod, or the reel leg 8 of the dual-bearing reel illustrated in FIGS. 2 to 4.

As described above, the corrosion member 100 can be provided in various places, such as an inside of the reel body, the handle, the reel leg, or the fishing line guiding device, and a shape or a mounting direction of the corrosion member can be variously modified depending on a provision position of the corrosion member.

As described above, a corrosion member is mounted on any component member of a reel, and this can effectively avoid corrosion that occurs between the component member and another component member that has a contact relationship (including a proximity relationship) with the component member. For example, corrosion can be effectively avoided in a portion of various function parts that are included in a driving force transmission mechanism or an oscillating mechanism, or a fixing member (a screw, a rivet, or the like) that connects component members.

An experiment was conducted to check a change status of a component member at the time of continuously immersing a fishing reel mounted with the corrosion member described above in seawater. A result of the experiment is described next.

Figure 12:
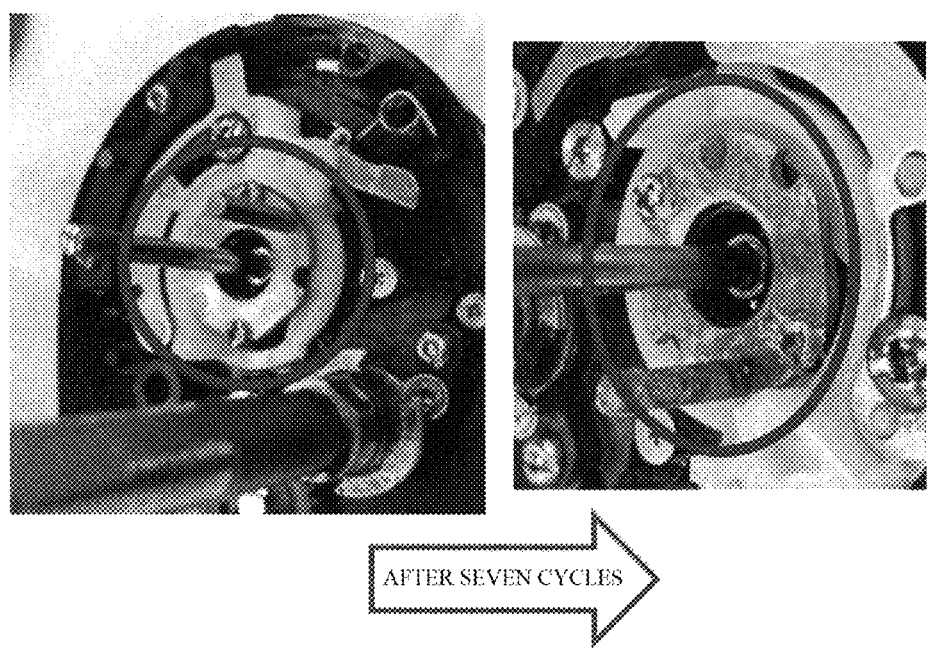
FIG. 12 is a photograph indicating a change status of a state where a corrosion member has been fastened with screws and has been mounted on a surface on a spool side of a set plate, and has been immersed in seawater.

FIG. 12 is a photograph indicating a change status of a state where a corrosion member (a portion that includes a ZDC plate, which is a zinc alloy for die casting, and is surrounded with a circle) was fastened with screws and was mounted on a surface on the spool side of the set plate, and was immersed in seawater. The corrosion member was continuously immersed for one hour, and this was repeated seven times. On a surface of the ZDC plate that is the corrosion member, the appearance of white precipitate (unevenness) was discovered, and corrosion occurred.

Figure 13A:
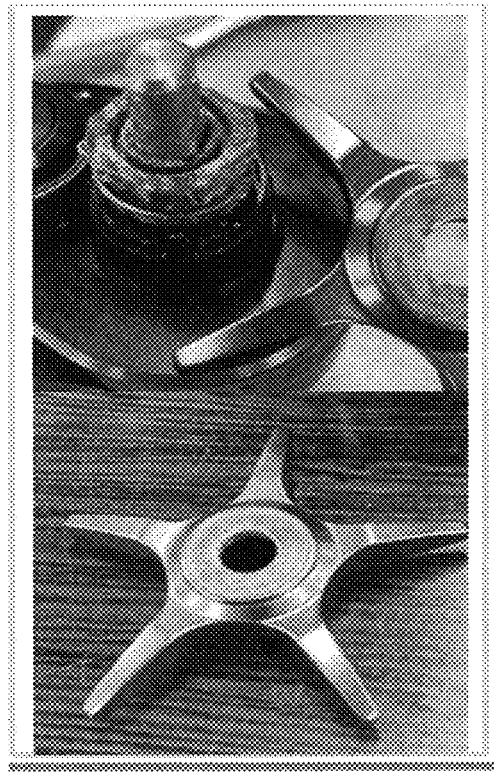
FIGS. 13A and 13B illustrate component members that are in contact with the set plate, and illustrate a protrusion portion region of a handle shaft made of SUS, and a drag knob mounted in the region.
Figure 13B:
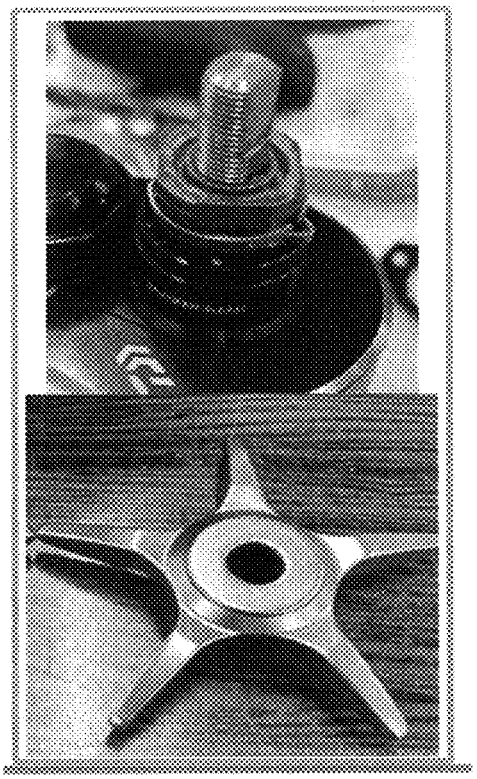

FIGS. 13A and 13B are photographs that indicate component members that are in contact with the set plate, and indicate a protrusion portion region of a handle shaft made of SUS, as is conventionally, and a drag knob after anodized aluminum treatment that is mounted on the protrusion portion region. FIG. 13A illustrates a configuration in which the corrosion member illustrated in FIG. 12 has not been arranged in the set plate, and FIG. 13B illustrates a configuration in which the corrosion member illustrated in FIG. 12 has been mounted on the set plate. Both diagrams illustrate a state at a time when the configuration was continuously immersed in seawater for one hour, and this was repeated seven times, similarly to FIG. 12.

As is apparent from these comparative photographs, a result indicates that if the corrosion member is mounted on the set plate, the corrosion member corrodes, but corrosion is not worsened in principal component members.

Figure 14A:
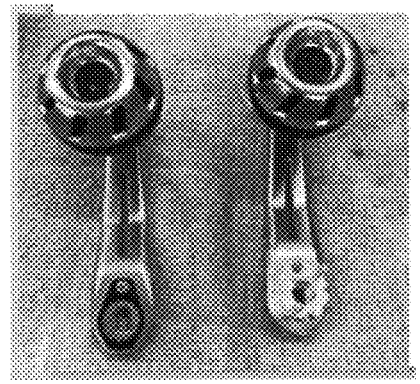
FIGS. 14A and 14B are photographs indicating a result of an experiment conducted to compare a case where a corrosion member has been mounted at a proximal end of a handle arm, and a case where the corrosion member has not been mounted, a left-hand side portion of FIG. 14A illustrates a case where an aluminum plate after anodized aluminum treatment is interposed, a right-hand side portion of FIG. 14A illustrates a case where a zinc plate (a corrosion member) having the same shape is interposed, a left-hand side portion of FIG. 14B illustrates a case where an aluminum plate is interposed, and a state where corrosion has occurred around a rivet made of SUS, and a right-hand side portion of FIG. 14B illustrates a case where the zinc plate is interposed, and a state where corrosion has not been observed around the rivet made of SUS.
Figure 14B:
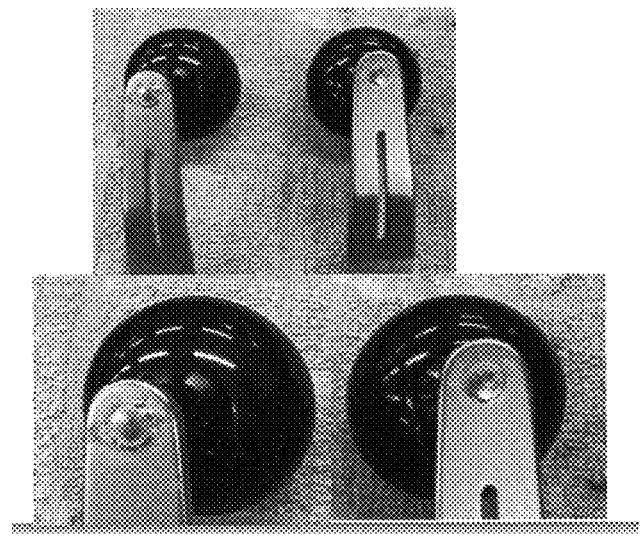

FIGS. 14A and 14B are photographs indicating a result of an experiment conducted to compare a case where the corrosion member has been mounted inside a proximal end (a portion that is installed on the handle shaft) of the handle arm, and a case where the corrosion member has not been mounted. The handle arm was obtained by performing anodized aluminum treatment on an aluminum alloy (A6061), and a handle knob was caulked with rivets made of SUS, and was fixed to a distal end of the handle arm.

A left-hand side portion of FIG. 14A indicates a case where an aluminum plate (black) after anodized aluminum treatment is interposed at a proximal end in order to prevent a nut from loosening, and the aluminum plate has been interposed. A right-hand side portion of FIG. 14A indicates a case where a zinc plate (white) having the same shape is interposed. Seawater was sprayed onto these two handle arms for three weeks. In a case where the aluminum plate is interposed, corrosion occurred around a rivet made of SUS (a left-hand side portion of FIG. 14B). In a case where the zinc plate is interposed, corrosion was not observed around the rivet made of SUS (a right-hand side portion of FIG. 14B).

Aluminum has a great ionization tendency than zinc, but it can be considered that a conductive area decreases if anodized aluminum treatment has been performed, as described above. It can be considered that an effect was achieved even if the zinc plate described above was mounted.

According to the present disclosure, as described above in the embodiment, a corrosion member can be attached or detached inside a reel body of a fishing reel or on a surface (a position that fails to be visually recognized is preferable) of a component member that is exposed to an outside of the reel body. In a case where corrosion has been worsened, a maintenance task can be performed to exchange the corrosion member for a dedicated corrosion member. Therefore, the present disclosure comprises a corrosion member that can be attached to or detached from a portion where component members comprising different types of materials are arranged in a contact state or a proximity state, and that comprises a material having a potential difference that is greater than a potential difference between the component members comprising the different types of materials. Such a corrosion member can be manufactured and sold as an exchange part (a dedicated product), and a shape may be specified depending on an installation position or an installation method, a block shape may be employed rather than a plate shape, or a shape that achieve some functions may be employed.

Furthermore, such a corrosion member is formed in a zinc plate shape, and this enables a satisfactory processability and a reduction in a cost.

The embodiment according to the present disclosure has been described above. The present disclosure is not limited to the embodiment described above, and various modifications can be made. The present disclosure can be applied to a variety of fishing reels, such as an electric reel or a single-bearing reel, in addition to the type described above of reel, and a mounting position of the fishing reel can also be variously changed. Furthermore, corrosion does not only occur in contact between metal members, but also occurs, for example, in the case of different types of materials such as carbon and aluminum. Therefore, an optimal corrosion member may be mounted in consideration of a potential difference generated between component members.

What is claimed is:

1. A fishing reel that comprises component members of various types arranged in a reel body, winds up a fishing line around a spool, and releases the fishing line that has been wound up around the spool,
    wherein the component members are arranged in a contact state or a proximity state, the component members comprising different types of materials that are different in a raw material, and
    a corrosion member is attachably/detachably arranged on the component members in a conductive state, the corrosion member having a potential difference that is greater than the potential difference between the component members comprising the different types of materials.

2. The fishing reel according to claim 1, wherein
    the fishing reel includes a dual-bearing reel, and
    the corrosion member is arranged in a side plate included in the reel body.

3. The fishing reel according to claim 2, wherein the corrosion member comprises a plate-shaped member, and is attachably/detachably attached on a side of a spool facing face of a set plate that supports a winding-up driving mechanism that drives and rotates the spool.

4. The fishing reel according to claim 3, wherein the corrosion member has a ring shape such that a support portion of the set plate protrude.

5. The fishing reel according to claim 2, wherein the corrosion member comprises a plate-shaped member, and is attached to a set plate that is attachably/detachably mounted on a side of a frame that the spool is detached from.

6. The fishing reel according to claim 1, wherein
    the fishing reel includes a spinning reel, and
    the corrosion member is attachably/detachably mounted on an upper face of a rotor that is driven to rotate in accordance with an operation to rotate a handle.

7. The fishing reel according to claim 1, wherein
    the fishing reel includes a spinning reel, and
    the corrosion member is attachably/detachably mounted inside a handle arm.

8. The fishing reel according to claim 1, wherein
    the fishing reel includes a spinning reel, and
    the corrosion member is attachably/detachably mounted inside a rear chap that is installed at a rear end of the reel body.

9. The fishing reel according to claim 1, wherein the corrosion member is attachably/detachably mounted on a sole of a reel leg that is provided in the reel body, and is mounted on a reel leg fixing portion of a fishing rod.

10. The fishing reel according to claim 1, wherein the corrosion member is attachably/detachably mounted on a knob cap of a handle that is rotatably provided in the reel body.

11. A corrosion member that is mounted on a fishing reel, wherein
    component members of various types comprise different types of materials that are different in a raw material, the component members being arranged in a reel body,
    the corrosion member is attachable to or detachable from a portion where the component members comprising the different types of materials are arranged in a contact state or a proximity state, and the corrosion member comprises a material having a potential difference that is greater than the potential difference between the component members comprising the different types of materials.

12. The corrosion member according to claim 11 that is mounted on the fishing reel, wherein the corrosion member is made of zinc, and has a plate shape.

* * * * *